H. F. PENDLETON.
ROLLER, BUMPER, &c.
APPLICATION FILED DEC. 29, 1909.

956,503.

Patented Apr. 26, 1910.

Witnesses:

Inventor
Harry Fillmore Pendleton.
By his Attorney
Frederick I. Allen

UNITED STATES PATENT OFFICE.

HARRY FILLMORE PENDLETON, OF BROOKLYN, NEW YORK, ASSIGNOR TO THE AMERICAN WRINGER COMPANY, A CORPORATION OF RHODE ISLAND.

ROLLER, BUMPER, &c.

956,503.

Specification of Letters Patent. Patented Apr. 26, 1910.

Original application filed November 15, 1907, Serial No. 402,233. Divided and this application filed December 29, 1909. Serial No. 535,535.

*To all whom it may concern:*

Be it known that I, HARRY FILLMORE PENDLETON, residing at Brooklyn, in the county of Kings and State of New York, have invented certain new and useful Improvements in Rollers, Bumpers, and Similar Articles, of which the following is a specification.

This invention relates to rollers, bumpers, and similar articles, and has for an object the production of articles of the class described, comprising a core of relatively porous and preferably flexible material, such as rope, upon and partly within the interstitial spaces of which is immovably held a suitable covering, such as vulcanized rubber.

Another object of the invention is to produce, as a new article of manufacture, a bumper or the like comprising a core provided with interstitial spaces, and a covering of vulcanized material compressed radially thereupon and engaging said spaces.

The characteristics of this invention, together with a process by which it may well be manufactured, will be hereinafter explained, reference being had to the accompanying drawing, in which—

Figure 1:
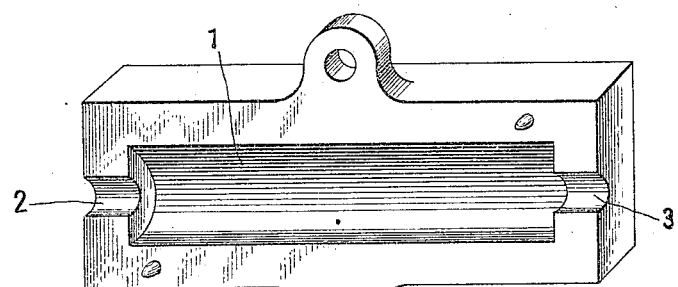
Figure 2:
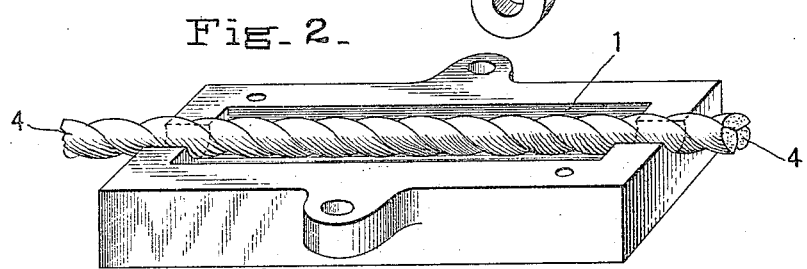
Figure 3:

Figures 1 and 2 show the parts of an ordinary mold such as may be used in producing my invention, while Fig. 3 shows the completed article.

Referring to the numerals on the drawing, 1 indicates the cavities of corresponding mold sections, adapted to receive the rope core 4, which is here shown as made up of twisted strands.

2 and 3 indicate egress channels for the rope, and it will be understood that while the rope or core is tightly inclosed within the egress channels, the cavity 1 is larger in diameter, than the core. This is in order that the rubber to be vulcanized upon the core may be placed around it within the mold. The material within the mold may then be subjected to vulcanizing heat while the mold sections are held tightly together, the necessary vent of the mold being through the core and channels 2 and 3. It is evident that the expansion of the rubber in the vulcanizing process will force it into the depressions of the rope or core, and cause it to grip the latter firmly. The materials employed are the usual ones for this purpose, and the heat is applied in the usual manner. The resultant product shows that the rubber is forced into the most minute depressions upon the surface of the core, and even into the interstices below the surface, so that their union is practically indissoluble.

Articles made in accordance with this invention are capable of wide employment, in appropriately modified forms, as rollers, or bumpers, or wherever their qualities of flexibility, elasticity, and tensile strength may be required.

The present invention includes subject-matter divided out from my application, Serial No. 402,233, filed November 15th, 1907, for methods of vulcanizing rubber and articles made thereby.

Having thus described my invention what I claim as new and desire to secure by Letters Patent is:

1. As an article of manufacture, a fibrous rope core provided with a covering of vulcanized material compressed radially thereupon.

2. As an article of manufacture, a fibrous rope core made up of twisted strands, and provided with a covering of vulcanized material compressed radially thereupon.

3. As an article of manufacture, a fibrous rope core provided with a covering of vulcanized material compressed radially thereupon and partly into the interstices thereof.

4. As an article of manufacture, an elongated fibrous core provided with interstitial spaces, and a covering of vulcanized material compressed radially thereupon and entering said spaces.

5. As an article of manufacture, a flexible elongated fibrous core provided with interstitial spaces, and a covering of vulcanized material compressed radially thereupon and entering said spaces.

In witness whereof I affix my signature in the presence of two witnesses.

HARRY FILLMORE PENDLETON.

Witnesses:
ANNA CAREY DILLS,
ELEANOR MEAD.